Patented Aug. 11, 1942

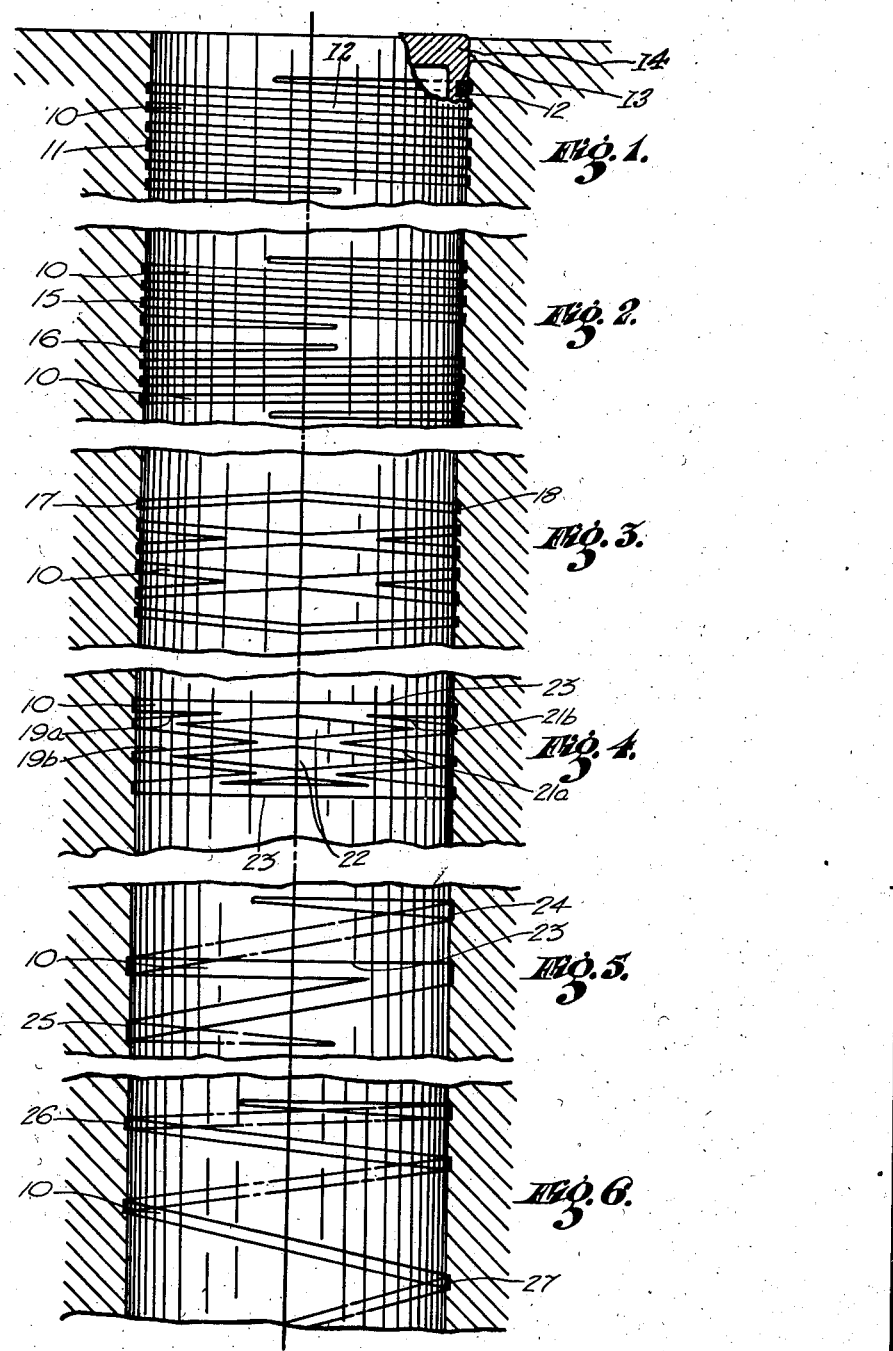

2,292,662

UNITED STATES PATENT OFFICE 2,292,662

CYLINDER BORE

Arthur Freeman Sanders, Leeds, England, assignor to John Fowler & Co. (Leeds) Limited, Leeds, England Application July 10, 1941, Serial No. 401,833
In Great Britain March 14, 1941

6 Claims. (Cl. 309—2)

This invention relates to cylinder bores whether of cylinder blocks, cylinder liners or (in the case of sleeve-valve engines) cylinder sleeves, and particularly to the bores of cylinder liners for internal-combustion engines.

The main object is to provide improved methods of resisting wear of the bore.

Patent specification No. 2,108,392 describes a cylinder liner having let into its bore near the axially-outer end thereof (the explosion end of an internal-combustion engine) two or more hard-wearing metal strips spaced from one another. The strips may be angularly-spaced round the bore and of helical shape, preferably being arranged so that they overlap one another in an axial view of the liner. The specification further discloses a liner having a circumferential hard-wearing metal strip let into its bore near the axially-outer end thereof and also angularly-spaced strips of similar metal, preferably helically arranged, extending axially inwardly of the bore from the circumferential strip. In all cases the strips may be of material welded into shallow grooves formed in the bore of the liner or electrically deposited therein.

The present invention involves various alternatives which are all found to be satisfactory.

In the accompanying sheet of drawings:

Figure 1 is a fragmentary sectional elevation showing one method of applying the invention to a cylinder bore, the figure also showing in section a portion of a piston adapted to reciprocate therein; and Figures 2 to 6 are fragmentary sectional elevations showing other ways in which a cylinder bore may be adapted according to the invention.

In all the figures the groove (or grooves) in the cylinder bore is shown as being filled either by welding spraying or electro-deposition with a hard-wearing metal or alloy such as a chromium alloy 10. After the filling the entire surface of the bore will be machined to be smooth.

In one alternative according to the invention, as shown by Figure 1, there is a single helical groove 11 of fine pitch, naturally in the vicinity of where the major wear would occur, of more than one convolution—in point of fact, approximately six complete convolutions are shown in Figure 1. The land 12 between adjacent convolutions is slightly less in width (in an axial direction) than the corresponding dimension of a piston ring 13 carried in the top ring groove of a piston 14.

In another alternative the cylinder bore has at least two helical grooves in its surface spaced axially from one another, the grooves together completely encircling the circumference of the bore in an axial view. If of opposite sense, however, they need not be spaced axially. In the construction of Figure 2 there are two fine-pitch helical grooves 15, 16 filling up the region where the major wear would occur, and these grooves are shown as being spaced axially from one another and of opposite sense.

In another alternative, in which helical grooves of opposite sense are used, these are superposed so as to give a diamond-pattern effect. Thus, in the construction of Figure 3, there are two similar helical grooves 17, 18 of opposite sense which are superposed upon one another to provide a diamond pattern, the pitch being somewhat coarser than in the case of the two preceding figures.

It will be evident that a variation of this latter construction, as shown by Figure 4, involves the use of, say, four helical grooves 19a, 19b and 21a, 21b, preferably of still coarser pitch, two 19a and 19b being of opposite sense to the other two 21a, 21b and all being arranged to split up the surface into diamonds 22. Obviously if the grooves are of the same pitch and symmetrically arranged the diamonds will be similar to one another. The figure also shows the helical grooves as extending between two partial or complete circumferential grooves 23.

In any of the alternatives there may also be provided a circumferential or part-circumferential groove filled as aforesaid and spaced from or adjoining one or more of the helical grooves. Thus, Figure 5 shows a relatively-wide circumferential groove 23 (intended in this case to extend completely round the bore) with helical grooves 24, 25 extending from diametrically-opposite places of the circumferential groove and from opposite sides thereof, the helical grooves being of opposite sense and in this case each of less than one convolution. In an axial view of the bore, however, the circumference of the bore is completely encircled by the combined helical grooves. Obviously, if desired, these helical grooves might be spaced axially, or either of them might, from the circumferential grooves 23. And each might be replaced by a pair or more of opposite-sense, superposed, helical grooves, as described above in connection with Figure 3 or Figure 4.

Furthermore, such a helical groove may be greater in depth (i. e., in a radial direction) where the wear would be greatest than elsewhere, or the groove may be an irregular helical one having a finer pitch where the wear would be greatest than elsewhere. Figure 6 demonstrates that such a helical groove need not be a regular one, the portion 26 at the place where the wear would be greatest being of finer pitch than elsewhere—for example at 27, where the wear would be less.

What I claim as my invention and desire to secure by Letters Patent of the United States is:

1. In combination, a fluid-pressure engine having a cylinder bore, said bore having at least two helical grooves in its surface in the vicinity of where the major wear would occur, said grooves being of opposite sense and being filled with a wear-resistant metal or alloy.

2. The combination of claim 1, in which said grooves together completely encircle the circumference of said bore in an axial view.

3. In combination, an internal-combustion engine having a cylinder bore provided in its surface, in the vicinity of where the major wear would occur, with at least two superposed helical grooves, of opposite sense, said grooves being filled with a wear-resistant metal or alloy.

4. The combination of claim 1, in which said bore has also a circumferential groove filled with a wear-resistant metal or alloy.

5. In a fluid-pressure engine, a piston adapted to reciprocate in a cylinder bore, said piston carrying a piston-ring above the wrist-pin, and said bore having a helical groove of more than one convolution in its surface, in the vicinity of where the major wear would occur, said groove being filled with a wear-resistant metal or alloy, and said piston-ring having a greater width (in an axial direction) than the land between adjacent convolutions of said groove.

6. A cylinder bore having a fine-pitch helical groove in its surface in the vicinity of where the major wear would occur, said groove being of more than one complete convolution and being filled with a wear resistant material, and a circumferential groove in said bore filled with a wear-resistant material.

ARTHUR FREEMAN SANDERS.